United States Patent
Nakazawa et al.

(10) Patent No.: US 7,092,239 B2
(45) Date of Patent: Aug. 15, 2006

(54) ELECTRIC DOUBLE LAYER CAPACITOR WITH IMPROVED ACTIVATED CARBON ELECTRODES

(75) Inventors: Yutaka Nakazawa, Tokyo (JP); Koji Sakata, Tokyo (JP); Ryuuichi Kasahara, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 555 days.

(21) Appl. No.: 10/066,693

(22) Filed: Feb. 6, 2002

(65) Prior Publication Data

US 2002/0154467 A1 Oct. 24, 2002

(30) Foreign Application Priority Data

Feb. 6, 2001 (JP) .............................. 2001-029608

(51) Int. Cl.
*H01G 9/00* (2006.01)

(52) U.S. Cl. ...................................... 361/502; 361/503

(58) Field of Classification Search ................ 361/15, 361/320, 321.1, 321.2, 321.3, 502, 503, 504, 361/505, 500, 506, 508, 512
See application file for complete search history.

(56) References Cited

U.S. PATENT DOCUMENTS

| | | | |
|---|---|---|---|
| 4,343,870 A * | 8/1982 | Heller et al. ................. | 429/111 |
| 4,980,250 A * | 12/1990 | Takahashi et al. ........... | 429/306 |
| 5,069,683 A * | 12/1991 | Fong et al. .................. | 29/623.1 |
| 5,136,473 A * | 8/1992 | Tsuchiya et al. ............. | 361/502 |
| 5,557,497 A * | 9/1996 | Ivanov et al. ................ | 361/502 |
| 5,591,545 A | 1/1997 | Miyashita et al. | |
| 5,776,633 A * | 7/1998 | Mrotek et al. ........... | 429/231.8 |
| 5,796,574 A * | 8/1998 | Saito et al. .................. | 361/502 |
| 5,973,912 A | 10/1999 | Kibi et al. ................... | 361/502 |
| 6,053,953 A * | 4/2000 | Tomiyama et al. ......... | 29/623.1 |
| 6,127,474 A * | 10/2000 | Andelman ................... | 524/495 |
| 6,171,729 B1* | 1/2001 | Gan et al. .............. | 429/231.95 |
| 6,225,733 B1* | 5/2001 | Gadkaree et al. ............ | 313/352 |
| 6,544,648 B1* | 4/2003 | Nesbitt et al. ............... | 428/408 |
| 6,562,513 B1* | 5/2003 | Takeuchi et al. ............ | 429/189 |
| 6,631,074 B1* | 10/2003 | Bendale et al. .............. | 361/509 |

FOREIGN PATENT DOCUMENTS

| | | |
|---|---|---|
| EP | 0 867 901 | 9/1998 |
| JP | 1-196807 | 8/1989 |
| JP | 5-82395 | 2/1993 |
| JP | 08-055761 | 2/1998 |
| JP | A 10-261550 | 9/1998 |
| JP | 2000-344507 | 12/2000 |
| WO | 93/10566 | 5/1993 |
| WO | 98/26439 | 6/1998 |
| WO | 99/43614 | 9/1999 |

* cited by examiner

*Primary Examiner*—Brian Sircus
*Assistant Examiner*—Danny Nguyen
(74) *Attorney, Agent, or Firm*—Young & Thompson

(57) ABSTRACT

An electric double layer capacitor comprises: a separator; a pair of electrodes separated by the separator, and the electrodes including activated carbon particles and a binder binding the activated carbon particles; and a pair of collectors separated by the pair of electrodes, wherein a density of the electrodes is in the range of 1.4 g/cm3 to 1.8 g/cm3.

6 Claims, 4 Drawing Sheets

ELECTRIC DOUBLE LAYER CAPACITOR WITH IMPROVED ACTIVATED CARBON ELECTRODES

BACKGROUND OF THE INVENTION

1. Field of the Invention

The present invention relates to an electric double layer capacitor with activated carbon electrodes, and more particularly to an improved activated carbon electrode for an electric double layer capacitor.

2. Description of the Related Art

Electric double layer capacitors are suitable for supplying a large electric energy for driving a motor of an electric car or for realizing an energy recycle system, because the electric double layer capacitors are high in energy density and power density. In order to have further increased the energy density, it was proposed to increase a density of activated carbon in the electrodes of the electric double layer capacitor.

Japanese laid-open patent publication discloses a conventional electric double layer capacitor with electrodes which comprise a mixture of an activated carbon containing phenol resin and a sulfuric acid solution. The activated carbon containing phenol resin comprises a carbon paste with a density of about 0.6 g/cm3. The sulfuric acid solution contains 0.1–0.8% by weight of poly-4-vinylpyridine. The conventional electric double layer capacitor has the following disadvantages.

The conventional electric double layer capacitor is small in capacity for a unit volume and large in equivalent series resistance (ESR). The reason why the capacity is small would be that the electrode density is small, for example, about 0.6 g/cm3, and thus a filling amount of activated carbon for a unit volume is small, whereby a contact area to an electrolyte is small. The reason why the equivalent series resistance (ESR) is large would be that a contact resistance between activated carbons is high.

Japanese laid-open patent publication No. 5-82395 discloses another conventional electric double layer capacitor with polarization electrodes which comprise a sintered solid-state activated carbon impregnated with a diluted sulfuric acid. The electrodes have a specific surface area in the range of 2000–3200 m2/gr. The electrodes have a density in the range of 0.42–0.6 g/cm3.

It is advantageous that activated carbon particles are sintered in order to obtain a large reduction in the contact resistance between activated carbons. It is, however, undesirable that the electrode density is small, for example, in the range of 0.42–0.6 g/cm3, and thus the capacity for the unit volume is small.

In the above circumstances, the development of a novel electric double layer capacitor with improved activated carbon electrodes free from the above problems is desirable.

SUMMARY OF THE INVENTION

Accordingly, it is an object of the present invention to provide a novel electric double layer capacitor with improved activated carbon electrodes free from the above problems.

It is a further object of the present invention to provide a novel electric double layer capacitor with improved activated carbon electrodes, which have a high capacity and a low equivalent series resistance (ESR).

It is a still further object of the present invention to provide a novel activated carbon electrode for an electric double layer capacitor free from the above problems.

It is yet a further object of the present invention to provide a novel activated carbon electrode for an electric double layer capacitor which have a high capacity and a low equivalent series resistance (ESR).

The present invention provides an electric double layer capacitor comprising: a separator; a pair of electrodes separated by the separator, and the electrodes including activated carbon particles and a binder binding the activated carbon particles; and a pair of collectors separated by the pair of electrodes, wherein a density of the electrodes is in the range of 1.4 g/cm3 to 1.8 g/cm3.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

A first aspect of the present invention is an electric double layer capacitor having electrodes which include activated carbon particles and a binder binding the activated carbon particles, wherein a density of the electrodes is in the range of 1.4 g/cm3 to 1.8 g/cm3.

It is preferable that a specific resistance of the electrodes is in the range of 2.0 $\Omega$ cm to 7.0 $\Omega$ cm.

It is also preferable that an averaged diameter of the activated carbon particles is in the range of 5 micrometers to 13 micrometers, and a particle size distribution thereof is in the range of 2 micrometers to 20 micrometers.

It is also preferable that the binder contains a fluoro-containing polymer or polyvinylidene fluoride.

A second aspect of the present invention is an electric double layer capacitor comprising: a separator; a pair of electrodes separated by the separator, and the electrodes including activated carbon particles and a binder binding the activated carbon particles; and a pair of collectors separated by the pair of electrodes, wherein a density of the electrodes is in the range of 1.4 g/cm3 to 1.8 g/cm3.

It is also preferable that a specific resistance of the electrodes is in the range of 2.0 $\Omega$ cm to 7.0 $\Omega$ cm.

It is also preferable that an averaged diameter of the activated carbon particles is in the range of 5 micrometers to 13 micrometers, and a particle size distribution thereof is in the range of 2 micrometers to 20 micrometers.

It is also preferable that the binder contains a fluoro-containing polymer.

It is also preferable that the binder contains polyvinylidene fluoride.

A third aspect of the present invention is an electrode including: activated carbon particles; and a binder binding the activated carbon particles, wherein a density of the electrodes is in the range of 1.4 g/cm3 to 1.8 g/cm3.

It is also preferable that a specific resistance of the electrodes is in the range of 2.0 Ω cm to 7.0 Ω cm.

It is also preferable that an averaged diameter of the activated carbon particles is in the range of 5 micrometers to 13 micrometers, and a particle size distribution thereof is in the range of 2 micrometers to 20 micrometers.

It is also preferable that the binder contains a fluoro-containing polymer.

It is also preferable that the binder contains polyvinylidene fluoride.

In accordance with the present invention, an electric double layer capacitor mainly comprises a separator, activated carbon electrodes sandwiching the separator, and collectors sandwiching the activated carbon electrodes. The activated carbon electrodes are in a form of thin film. The activated carbon electrodes include an electrolyte solution.

Figure 1:
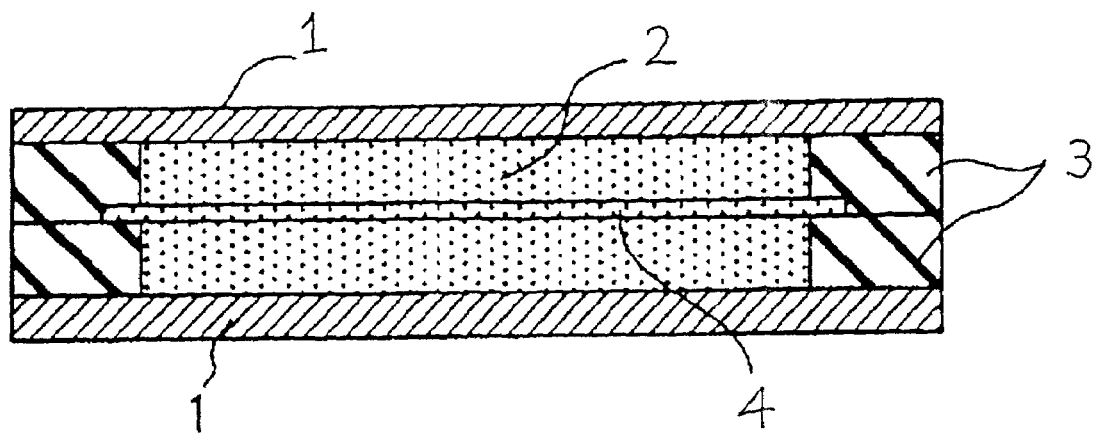
FIG. 1 is a cross sectional elevation view of an electric double layer capacitor in accordance with the present invention.

FIG. 1 is a cross sectional elevation view of an electric double layer capacitor in accordance with the present invention. The electric double layer capacitor may comprise a separator 4, a pair of polarization electrodes 2 sandwiching the separator 4, a pair of gaskets 3 surrounding peripherals of the polarization electrodes 2, and a pair of collectors 1 sandwiching the polarization electrodes 2 and the gaskets 3.

A basic cell of the electric double layer capacitor may optionally shaped in various shapes, for example, a cylindrical shape or a prismatic shape. The separator 4 may further comprise a porous separator which has a non-electron-conductivity and an ion-permeability. A preferable example of the porous separator 4 is a porous polypropylene-based film having a thickness of about 30 micrometers.

The gaskets 3 may comprise an electrical insulator such as an electrically insulative resin, for example, an electrically insulative butyl rubber. Each of the gaskets 3 may be shaped in accordance with the shape of the basic cell of the electric double layer capacitor, for example, a circular-shaped ring or a polygonal-shaped ring. Each of the gaskets 3 may have a thickness of about 100 micrometers. Each of the gaskets 3 surrounds each of the polarization electrodes 2.

The collectors 1 may comprise an electrically conductive material such as an electrically conductive butyl rubber or an electrically conductive plastic film. Each of the collectors 1 may have a thickness of about 100 micrometers.

Figure 2:
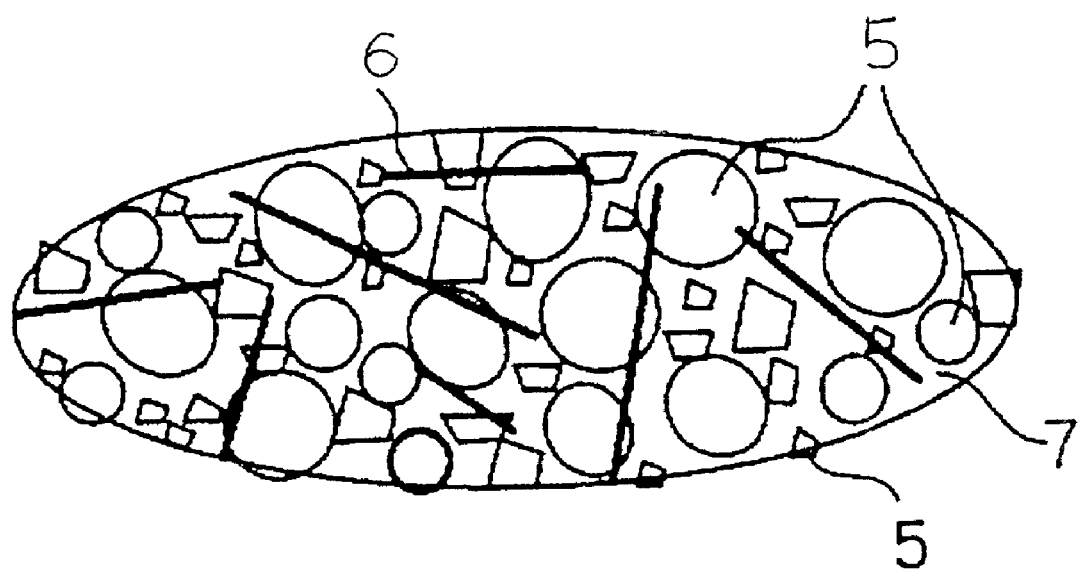
FIG. 2 is a fragmentary schematic view illustrative of an internal structure of the electrodes of the electric double layer capacitor shown in FIG. 1.

The electrodes 2 may optionally be shaped, for example a disk-shape having a diameter of about 3 cm and a thickness of about 100 micrometers. FIG. 2 is a fragmentary schematic view illustrative of an internal structure of the electrodes of the electric double layer capacitor shown in FIG. 1. The electrodes 2 may comprise activated carbon powders 5, binders 6 for binding the activated carbon powders 5 to each other, and an electrolytic solution 7 which is impregnated into the activated carbon powders 5.

The activated carbon powders 5 may preferably be an activated carbon which has a high specific surface area, wherein a specific surface area measured by BET method is in the range of 900 m2/g to 1600 m2/g. An averaged particle diameter of the activated carbon powders 5 may preferably be in the range of 5 micrometers to 13 micrometers. More preferably, a particle size distribution of the activated carbon powders 5 is in the range of 2 micrometers to 20 micrometers. The averaged particle diameter and the particle size distribution may be measured by know available methods, for example, a light-transmission centrifugal sedimentation method.

The electrodes 2 have a density in the range of 1.4 g/cm3 to 1.8 g/cm3 for ensuring a sufficiently high energy density. A specific resistance of the electrodes 2 may preferably be in the range of 2.0 ohms cm to 7.0 ohms cm.

The binder 6 may be a binder which may allow conductivity between the activated carbon powders 5. Fluoro-containing polymers are preferable as the binder 6, and particularly polyvinylidene fluoride (PVDF) is preferable. A content of the binder 6 in the electrode 2 is preferably not less than 1% by weight and not more than 20% by weight. If the content of the binder 6 is excessively low, this might make it difficult to obtain a desirably low equivalent series resistance value on the ground that an insufficient binding between the activated carbon powders 5 results in low conductivity between the activated carbon powders 5.

The electrolytic solution 7 may preferably comprise aqueous solutions such as a sulfuric acid solution. Non-aqueous solutions are also available. For example, electrolyte such as borofluoride or hexafluoride phosphate from tetraethyl ammonium may be dissolved into an organic solvent such as propylene carbonate or gamma-butyllactone to obtain an available electrolytic solution.

The electric double layer capacitor may be formed as follows. In a first step, the activated carbon powders 5 and the binder 6 are mixed at a predetermined ratio, whereby the binder 6 is dissolved into the solvent and mixed with the activated carbon powders 5. As a result, an electrode material is prepared. In a second step, films of the electrode material are formed over the collectors 1 by available methods, for example, a printing method such as a screen printing method or a deposition system such as a doctor-blade. In a third step, 20–50 wt %-sulfuric acid solution is impregnated into the electrodes 2 and the separator 4. In a fourth step, the gaskets 3 of the electrically insulative butyl rubber are placed over the collectors 1 to surround the peripherals of the electrodes 2, thereby preparing two sets of the electrodes 2, the gaskets 3 and the collectors 1. In a fifth step, the separator 4 and the two sets of the electrodes 2, the gaskets 3 and the collectors 1 are assembled, so that the electrodes 2 and the gaskets 3 sandwich the separator 4. In a sixth step, the assembly is then heated to cause a vulcanization reaction of the butyl rubber of the gaskets 3, whereby interfaces between the collectors 1 and the gaskets 3 and other interfaces between the gaskets 3 are sealed. A temperature of the heat treatment may be decided to cause no thermal decomposition of the binder 6.

EXAMPLE 1

Ten electric double layer capacitors were prepared, wherein each of the capacitors comprise a separator 4 of a porous polypropylene-based film having a thickness of about 30 micrometers, a pair of polarization electrodes 2 sandwiching the separator 4, a pair of insulative butyl rubber gaskets 3 of 100 micrometers in thickness surrounding peripherals of the polarization electrodes 2, and a pair of conductive butyl rubber collectors 1 of 100 micrometers in thickness sandwiching the polarization electrodes 2 and the gaskets 3.

The electrodes 2 are disk-shaped at a diameter of about 3 cm and a thickness of about 100 micrometers. The electrodes 2 comprise activated carbon powders 5, binders 6 for binding the activated carbon powders 5 to each other, and an electrolytic solution 7 which is impregnated into the activated carbon powders 5. The activated carbon powders 5 have a high specific surface area, wherein a specific surface area measured by BET method is in the range of 900 m2/g to 1600 m2/g. An averaged particle diameter of the activated carbon powders 5 is in 10 micrometers. A particle size distribution of the activated carbon powders 5 is in the range of 2 micrometers to 20 micrometers. The binder 6 is polyvinylidene fluoride (PVDF).

Ten electric double layer capacitors having the above-described structure were prepared as follows. In a first step, 85 wt % of the activated carbon powders 5 and 15 wt % of the binder 6 were mixed, whereby the binder 6 was dissolved into the solvent and mixed with the activated carbon powders 5. As a result, an electrode material was prepared. In a second step, films of the electrode material were formed in disk shape over the collectors 1 by the printing method. In a third step, 30 wt %-sulfuric acid solution was impregnated into the electrodes 2 and the separator 4. In a fourth step, the ring-shaped insulative butyl rubber gaskets 3 were placed over the collectors 1 to surround the peripherals of the electrodes 2, thereby preparing two sets of the electrodes 2, the gaskets 3 and the collectors 1. In a fifth step, the separator 4 and the two sets of the electrodes 2, the gaskets 3 and the collectors 1 were assembled, so that the electrodes 2 and the gaskets 3 sandwich the separator 4. In a sixth step, the assembly was then heated at 120° C. for 5 minutes to cause a vulcanization reaction of the butyl rubber of the gaskets 3, whereby interfaces between the collectors 1 and the gaskets 3 and other interfaces between the gaskets 3 were sealed.

The prepared ten electric double layer capacitors were measured in electrostatic capacity, internal resistance, electrode density, and electrode specific resistance. Respective averaged values of the electrostatic capacity, internal resistance, electrode density, and electrode specific resistance are shown on the table 1 to be shown below.

The static capacity and the series connection resistance were obtained were obtained by impedance method. For example, the static capacity and the series connection resistance were obtained from respective impedance values for frequency f [Hz] measured by applying a bias voltage of +1V and a voltage of 10 mVrms at various frequencies in the range of 0.1 kHz to 10 kHz. Real part of the measured impedance corresponds to the resistance value R [Ω], whilst imaginary part of the measured impedance corresponds to the reactance X[Ω]. The electrostatic capacity $C[F]=1/(2\pi fX)$; (f=1[Hz]), (ESR)=R; (f=1[Hz]).

EXAMPLE 2

Ten electric double layer capacitors were prepared in the same manners as Example 1 except that 92.5 wt % of activated carbon powders and 7.5 wt % of binder were mixed to prepare an electrode material. The prepared ten electric double layer capacitors were measured in electrostatic capacity, internal resistance, electrode density, and electrode specific resistance. Respective averaged values of the electrostatic capacity, internal resistance, electrode density, and electrode specific resistance are shown on the table 1.

EXAMPLE 3

Ten electric double layer capacitors were prepared in the same manners as Example 1 except that 98 wt % of activated carbon powders and 2 wt % of binder were mixed to prepare an electrode material. The prepared ten electric double layer capacitors were measured in electrostatic capacity, internal resistance, electrode density, and electrode specific resistance. Respective averaged values of the electrostatic capacity, internal resistance, electrode density, and electrode specific resistance are shown on the table 1.

COMPARATIVE EXAMPLE 1

Figure 3:
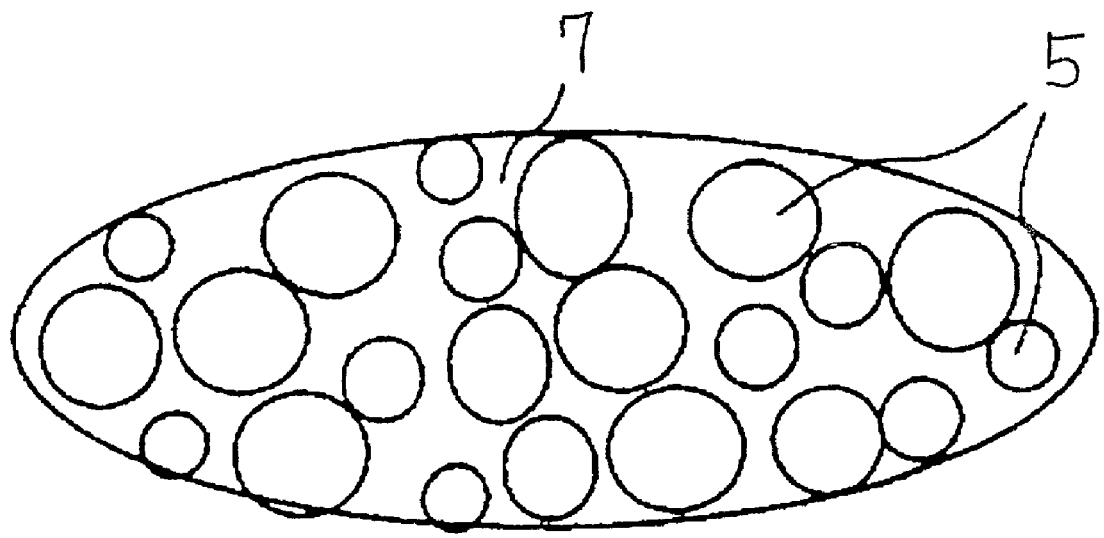
FIG. 3 is a fragmentary schematic view illustrative of an internal structure of the binder free polarization electrodes in the comparative example 1.

Ten electric double layer capacitors were prepared in the same manners as Example 1 except that polarization electrodes were prepared by using activated carbon powders and sulfuric acid solution without any binder in accordance with the conventional preparation method disclosed in Japanese laid-open patent publication No. 1-196807, whereby binder free polarization electrodes were prepared. FIG. 3 is a fragmentary schematic view illustrative of an internal structure of the binder free polarization electrodes in the comparative example 1.

The prepared ten electric double layer capacitors were measured in electrostatic capacity, internal resistance, electrode density, and electrode specific resistance. Respective averaged values of the electrostatic capacity, internal resistance, electrode density, and electrode specific resistance are shown on the table 1.

COMPARATIVE EXAMPLE 2

Figure 4:
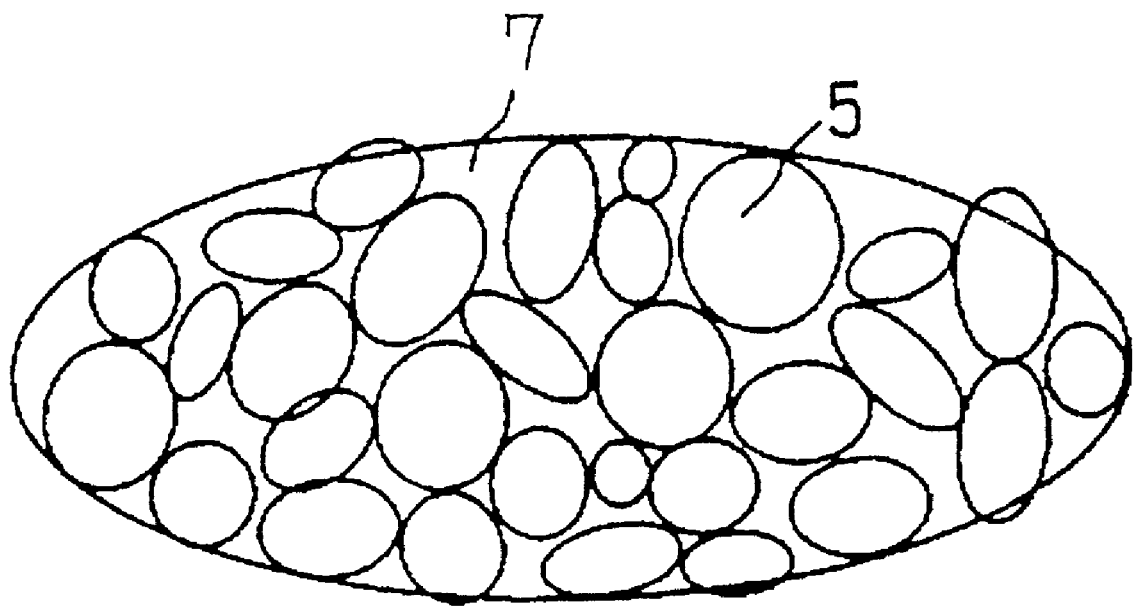
FIG. 4 is a fragmentary schematic view illustrative of an internal structure of the binder free polarization electrodes in the comparative example 2.

Ten electric double layer capacitors were prepared in the same manners as Example 1 except that polarization electrodes were prepared by using petroleum-pitch based activated carbon powders and sulfuric acid solution through sintering process thereof without using any binder in accordance with the other conventional preparation method disclosed in Japanese laid-open patent publication No. 5-82395, whereby binder free polarization electrodes were prepared. FIG. 4 is a fragmentary schematic view illustrative of an internal structure of the binder free polarization electrodes in the comparative example 2.

The prepared ten electric double layer capacitors were measured in electrostatic capacity, internal resistance, electrode density, and electrode specific resistance. Respective averaged values of the electrostatic capacity, internal resistance, electrode density, and electrode specific resistance are shown on the table 1.

TABLE 1

|  | capacity (F) | int. resistance (m-ohm) | density (g/cm3) | spec. resistance (ohm-cm) |
| --- | --- | --- | --- | --- |
| Ex. 1 | 6.02 | 30 | 1.43 | 6.87 |
| Ex. 2 | 6.48 | 22 | 1.62 | 3.92 |
| Ex. 3 | 6.86 | 19 | 1.77 | 2.51 |
| Comp. Ex. 1 | 3.19 | 47 | 0.52 | — |
| Comp. Ex. 2 | 2.97 | 36 | 0.43 | 9.73 |

Evaluation:

The electric double layer capacitors of Examples 1, 2 and 3 are sufficiently larger in electrostatic capacity and sufficiently smaller in equivalent series resistance as internal resistance as compared to the electric double layer capacitors of Comparative Examples 1 and 2.

The electric double layer capacitors of Examples 1, 2 and 3 are also sufficiently larger in density and sufficiently lower in specific resistance as compared to the electric double layer capacitors of Comparative Examples 1 and 2.

The above examples and comparative examples show that the present invention provides the electric double layer capacitors which are improved in large capacity and reduced equivalent series resistance. The reason, why the large capacity could be obtained, is that the particle size distribution of the activated carbon powders is sharpen in a narrow range of 2 micrometers to 20 micrometers to obtain large density.

The reason, why the low equivalent series resistance could be obtained, is that the binder allowing the conductivity between the activated carbon particles, for example, polyvinylidene fluoride (PVDF) is used to tightly inter-bind the activated carbon particles at high density.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. An electric double layer capacitor comprising:
   a separator;
   a pair of electrodes separated by said separator, and said electrodes including activated carbon powder and a binder binding said activated carbon powder; and
   a pair of collectors separated by said pair of electrodes,
   wherein a density of said electrodes is in the range of 1.4 g/cm3 to 1.8 g/cm3,
   wherein an averaged diameter of said activated carbon powder is in the range of 5 micrometers to 13 micrometers, and a particle size distribution thereof is in the range of 2 micrometers to 20 micrometers, and
   wherein a specific resistance of said electrodes is in the range of 2.0 Ωcm to 7.0 Ωcm.

2. The electric double layer capacitor as claimed in claim 1, wherein said binder contains a fluoro-containing polymer.

3. The electric double layer capacitor as claimed in claim 1, wherein said binder contains polyvinylidene fluoride.

4. An electrode including:
   activated carbon powder; and
   a binder binding said activated carbon powder,
   wherein a density of said electrodes is in the range of 1.4 g/cm3 to 1.8 g/cm3,
   wherein an averaged diameter of said activated carbon powder is in the range of 5 micrometers to 13 micrometers, and a particle size distribution thereof is in the range of 2 micrometers to 20 micrometers, and
   wherein a specific resistance of said electrodes is in the range of 2.Ωcm to 7.0 Ωcm.

5. The electrode as claimed in claim 4, wherein said binder contains a fluoro-containing polymer.

6. The electrode as claimed in claim 4, wherein said binder contains polyvinylidene fluoride.

* * * * *